United States Patent [19]

Yasukawa et al.

[11] Patent Number: 4,716,618
[45] Date of Patent: Jan. 5, 1988

[54] WIPER BLADE RUBBER

[75] Inventors: Takemasa Yasukawa, Inazawa; Hiroshi Sugita; Tadanobu Iwasa, both of Ichinomiya; Masanori Aritake, Nishikasugai, all of Japan

[73] Assignees: Toyoda Gosei Co., Ltd., Nishikasugai; Nippondenso Co., Ltd., Kariya, both of Japan

[21] Appl. No.: 932,142

[22] Filed: Nov. 18, 1986

[30] Foreign Application Priority Data

Nov. 19, 1985 [JP] Japan .................................. 60-259402

[51] Int. Cl.⁴ .................................................. B60S 1/38
[52] U.S. Cl. .................................. 15/250.36; 264/340; 428/492
[58] Field of Search .................. 15/250.36–250.42; 428/492; 264/340

[56] References Cited

U.S. PATENT DOCUMENTS

| 3,035,297 | 5/1962 | Overman et al. | 15/250.36 |
| 3,882,567 | 5/1975 | Herzog | 15/250.36 |
| 4,103,385 | 8/1978 | Porter | 15/250.36 |
| 4,622,712 | 11/1986 | Sugita et al. | 15/250.36 |
| 4,669,144 | 6/1987 | Yasukawa et al. | 15/250.36 |

FOREIGN PATENT DOCUMENTS 30646 2/1982 Japan .................................. 15/250.36

Primary Examiner—Peter Feldman
Attorney, Agent, or Firm—Cushman, Darby & Cushman

[57] ABSTRACT

A wiper blade rubber of an elongated configuration comprising a base portion of large thickness, a swinging portion substantially of a trigonal cross section, a neck portion connecting the base portion and the swinging portion and a thin plate-like lip portion disposed at the top end of the swinging portion. The basic material constituting most part of the base portion, the neck portion, the swinging portion and the lip portion is formed with soft and flexible rubber mainly composed of vulcanized ethylene-propylene rubber, and at least the surface of the lip portion is disposed with a surface layer constituted with a blended rubber composed of acrylonitrile-butadiene rubber and polyvinyl chloride resin and surface layer has a chlorinated surface layer.

5 Claims, 9 Drawing Figures

WIPER BLADE RUBBER

BACKGROUND OF THE INVENTION

1. Field of the Invention

This invention concerns a wiper blade rubber and, more specifically, it relates to a wiper blade rubber excellent in weather-proofness and, particularly, ozone cracking resistance with less frictional resistance upon sliding movement.

2. Description of the Prior Art

In FIG. 9, a wiper blade rubber is generally formed integrally as an elongate member comprising a base portion 10 of a large thickness, a swinging portion 30 substantially of a trigonal cross section, a neck portion 20 connecting the base portion 10 and the swinging portion 30, and a thin plate-like lip portion 40 disposed at the top end of the swinging portion 30. The base portion 10 is constituted with a head 11, a body 12 and a neck-like joining portion 13 connecting the head 11 and the body 12. The wiper blade rubber is inserted into a backing plate of a wiper and held while putting the backing plate provided between the head 11 and the body 12. Therefore the lip portion 40 moves slidingly on the glass surface for wiping out water droplets on the glass surface under the swinging movement of the swinging portion 30.

The wiper blade rubber as described above has been constituted with natural rubber (NR), or blended material prepared by blending NR with diene type rubber such as styrene-butadiene rubber (SBR), butadiene rubber (BR) and chloroprene rubber (CR).

Further, it has been known a method of chlorinating the surface or coating the surface with a surface layer containing lubricating fine powder such as molybdenum disulfide powder with an aim of reducing the frictional resistance upon sliding movement of the wiper blade rubber.

While the wiper blade rubber in the prior art as described above is excellent in the flexibility since the basic material is mainly composed of the diene rubber, it involves a disadvantage that the chemical double bonds of the constituent material are oxydized by ozone in the atmospheric air to result in crackings (ozone crackings). Because of the ozone crackings there has been a problem in the durability particularly, of the neck portion 20 to which the bending stress is exerted.

Further, although the chlorinated surface of the diene type rubber less causes ozone crackings, if the surface of the wiper blade rubber is entirely chlorinated, fitness to the uneven shape of the glass surface is worsened due to the rigidity of the wiper blade rubber. Accordingly, in the case of chlorination, it has been necessary to apply weak chlorination for the entire portion, or chlorination has to be excluded from the neck portion 20, however, in such the case, it becomes difficult to prevent the occurence of the ozone crackings. Further, the surface layer containing molybdenum disulfide powder or the like is not effective for preventing the occurence of the ozone crackings.

In the state where the wiper is not used, one side of the base portion 10 and the surface of the swinging portion 30 opposed by way of the neck portion 20 are urged to each other. If the blade is left as it is in this state for a long period of time, the base portion 10 and the swinging portion 30 may possibly be sticked to each other under the effect of sunlight or heat. If sticking occurs, turning of the swinging portion upon using the wiper becomes difficult so as to lower the wiping performance and the lip portion 40 tends to stand vertically thereby causing abnormal sounds due to the friction with the glass surface.

SUMMARY OF THE INVENTION

This invention has been accomplished in view of the foregoing problems and it is an object thereof to provide a wiper blade rubber capable of preventing the occurrence of ozone crackings.

It is an another object of this invention to provide a wiper blade rubber capable of reducing the frictional resistance during sliding movement.

It is a still another object of this invention to provide a wiper blade rubber capable of preventing sticking between the base portion and the swinging portion.

The foregoing objects of this invention can be attained by a wiper blade rubber of an elongated configuration comprising a base portion of a large thickness, a swinging portion substantially of a trigonal cross section, a neck portion connecting the base portion and the swinging portion, and a thin platelike lip portion disposed to the top end of the swinging portion, the base portion having a surface opposed to the swinging portion, and the swinging portion having a surface opposed to the base portion, wherein the basic material forming the most of the base portion, the neck portion, the swinging portion and the lip portion is a soft and flexible rubber mainly composed of vulcanized ethylene-propylene rubber, and at least the surface of the lip portion is disposed with a surface layer formed with a blended rubber composed of acrylonitrilebutadiene rubber and polyvinyl chloride resin and the surface layer has a chlorinated surface layer.

BRIEF DESCRIPTION OF THE ACCOMPANYING DRAWINGS

A more complete appreciation of the invention and many of the attendant advantages thereof will be readily obtained as the same becomes better understood by reference to the following detailed description when considered in connection with the accompanying drawings, wherein:

FIGS. 1, 2 and 3 show a wiper blade rubber of the first embodiment according to this invention, in which:

FIG. 1 is a cross sectional view;

FIG. 2 is an enlarged fragmentary cross sectional view of FIG. 1; and

FIG. 3 is a cross sectional view of an extrusion molding material molded for preparing the wiper blade rubber;

DETAILED DESCRIPTION OF THE PRESENT INVENTION

Figure 1:
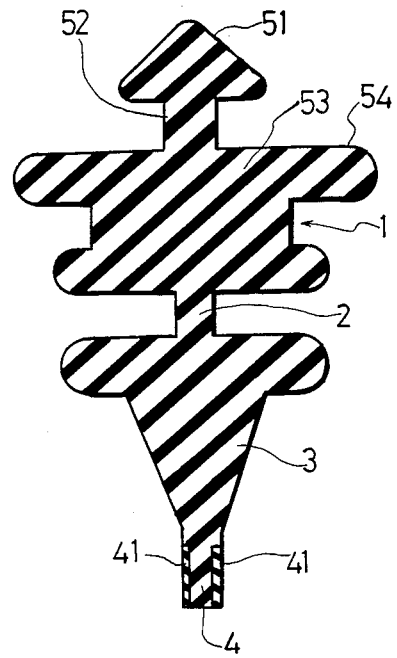

The wiper blade rubber according to this invention comprises a base portion, a neck portion, a swinging portion and a lip portion.

The base portion is a portion for providing the wiper blade rubber with the longitudinal rigidity and it is inserted and attached to a backing plate. The cross sectional configuration of the base portion can optionally be set. For instance, the base portion 1 can be constituted with a head 51, a body 53 and a neck-like joining portion 52 narrower than the head 51 and a wing 54 of a body 53 broader than the neck-like joining portion 52 formed symmetrically with respect to right and left, for example, from the side opposite to the neck portion 2.

The swinging portion 3 has substantially a trigonal cross section. The upper surface of the swinging portion 3 is in continuous with the lower surface of the base portion 1 by way of the neck portion 2. The neck portion 2 is a portion capable of causing the swinging portion 3 to swing relative to the base portion 1 and usually disposed at the central portion on one side of the swinging portion 3. The swinging portion 3 swings leftwardly and rightwardly with respect to the neck portion 2 as the center when the wiper blade rubber turns its direction during the reciprocal sliding movement along the glass surface.

The lip portion 4 is a thin plate-like protruded portion attached at the top in substantially a trigonal cross section of the swinging portion 3. The lip portion 4 is constituted such that both of the left and right surfaces are alternately in sliding contact with the glass surface accompanying the swing movement of the swinging portion 3.

The most important feature of this invention resides in the material constituting the wiper blade rubber. That is, the most prominent feature of this invention resides in a two-layer structure in which the composition for the basic material constituting the most portion of the base portion 1, the neck portion 2, the swinging portion 3 and the lip portion 4 is different from, for example, that for constituting the surface in contact with the glass surface in sliding movement.

The basic material for constituting the most portion of the wiper blade rubber is constituted with a soft and flexible rubber mainly composed of vulcanized ethylene-propylene rubber (EPDM). EPDM is excellent in the ozone cracking resistance and in flexibility. Accordingly, by using the EPDM as the main basic material, a wiper blade rubber excellent in both of the performances as described above can be obtained. EPDM may be used alone or in admixture with rubber such as NR, SBR, BR, CR and isoprene rubber (IR).

In the same manner as usual, those ingredients such as carbon black as reinforcing agent, vulcanizing agent, anti-aging agent and filler may properly be selected and blended into the basic material respectively in appropriate amounts depending on the aimed performances.

While EPDM has the excellent performance as described above, it involves a disadvantage that the frictional resistance upon sliding movement with the glass surface is large, and in that it can not be applied with chlorination. In view of the above, the surface layer capable of chlorination is provided at least to the surface of the lip portion, and chlorination is applied to the surface layer providing the chlorinated surface layer to reduce the frictional resistance during sliding movement.

Another feature of this invention resides in that the surface layer is constituted with a blended rubber composed of acrylonitorile-butadiene rubber (NBR) and polyvinyl chloride resin (PVC).

The diene type rubber can be chlorinated. Accordingly, a wiper blade rubber with low frictional resistance can be obtained by forming a diene type rubber layer to the surface of the basic material and applying chlorination. However, the diene type rubber is poor in the ozone cracking resistance. In view of the above, the method of adding an anti-aging agent to the diene type rubber may be considered. However, according to the study of the present inventors, it has been found that the ozone cracking resistance of products prepared by adding the anti-aging agent to the diene type rubber is satisfactory if it has a considerable thickness but the anti-aging agent is not effective in a thickness as thin as of about 0.2 mm. These results of the study are shown in the table.

In view of the above, the present inventors have made an earnest study and, as a result, have accomplished this invention based on the findings that both thin and thick blended rubbers of NBR and PVC are excellent in the ozone cracking resistance even with no addition of the anti-aging agent and comparable with EPDM. In the test for the ozone cracking resistance, specimens placed under such a tension as giving 15% elongation were exposed in an ozone atmosphere at 50 pphm concentration for 72 hours and the surface state after taking out them were judged with naked eyes.

TABLE

| Type of rubber Thickness of rubber | Addition of the anti-aging agent | Possibility of chlorination | Ozone-resistance Thick | Ozone-resistance Thin | Judgement |
| --- | --- | --- | --- | --- | --- |
| EPDM | N (not added) | X impossible | O good | O | X poor |
| NR | Y (added) | O possible | O | X poor | X |
| CR | Y | Δ almost impossible | O | X | X |
| SBR | Y | O | O | X | X |
| NR/CR | Y | O | O | X | X |
| NBR/PVC | N | O | O | O | O good |

For the composition ratio between NBR and PVC, from 15 to 70 parts by weight the PVC based on 100 parts by weight of NBR is preferred. The ozone cracking resistance becomes poor if PVC is less than 15 parts by weight, while on the other hand, physical property at cold temperature is reduced tending to be weakened if it exceeds 70 parts by weight.

In the same manner as the basic material, carbon black, filler, vulcanizing agent, etc can be added in a required amount to the blended rubber.

The surface layer constituted as described above is disposed at least to the surface of the lip portion 4. The thickness of the lip portion 4 is generally as thin as from 0.5 mm to 1.0 mm. The surface layers may preferably be disposed to both of the surfaces of the lip portion 4, which is contacted in sliding movement with the glass surface, by more than 0.05 mm respectively.

Although the surface layer may be disposed only to the lip portion 4, it may also be disposed to other sliding portion, for example, the head 51 in sliding movement with the backing plate or at the surface of the wing 54 of the body 53. Further, the surface layer may desirably be disposed to either one or both of the surfaces of the base portion 1 and the swinging portion 3 that are in contact with each other upon swinging movement of the swinging portion 3. In this way, sticking between the base portion 1 and the swinging portion 3 in the case of not using the wiper can be prevented, whereby reduction in the wiping performance and generation of abnormal sounds can be prevented.

The surface layer has a chlorinated surface layer which is reduced with the frictional resistance upon sliding movement due to chlorination, the chlorination can include, as usual, a hypochlorite acid treating method of immersing into an aqueous solution such as sodium hypochlorite, a method of immersing into a solution of a trichloro isocyanuric acid dissolved in a organic solvent as shown in Japanese Patent Laid-Open No. 63432/1981.

Upon preparing the wiper blade rubber according to this invention, rubber material mainly composed of EPDM as the basic material and rubber material mainly composed of NBR and PVC as the surface layer are extrusion molded with multicolors in a notvulcanized state to obtain an elongate molding material of a constant cross section. Then, the molded material is vulcanized. In this case, since the basic material and the surface layer are simultaneously vulcanized, they are joined integrally. Then, a chlorinated surface layer is formed to the surface layer by applying chlorination in this way, the wiper blade rubber can be prepared quite in the same manner as usual.

The wiper blade rubber according to this invention has the basic material comprising flexible rubber mainly composed of EPDM. Accordingly, it is excellent in an ozone cracking resistance and an endurance. Further, since it has a high flexibility, it can sufficiently follow even after the unevenness of the glass surface to surely wipe the water droplets.

Further, the wiper blade rubber according to this invention has, at least to the surface of the lip portion 4, a surface layer formed with a blended rubber mainly composed of NBR and PVC. And the surface layer has a chlorinated surface layer. The chlorinated surface layer has a low frictional resistance upon sliding movement and is excellent in the ozone cracking resistance even in a thin film of from 200 to 300 μm. Accordingly, it is excellent in the endurance for a long period of use and the frictional resistance with the glass surface and the like can be kept low.

Further, if the surface layer is disposed to at least one of the surface of the swinging portion 3 opposed to the base portion 1 and the surface of the base portion 1 opposed to the swinging portion 3, sticking is prevented when the wiper is not used and the reduction in the wiping performance and the generation of the abnormal sound can be prevented.

Further, the blended rubber of the surface layer is excellent in the oil resistance to eliminate the disadvantage of swelling due to wax remover or the like thereby extending the working life.

EXAMPLE

Having generally described this invention, a further understanding can be obtained by reference to certain specific examples which are provided herein for purposes of illustration only and are not intended to be limiting unless otherwise specified.

(EXAMPLE 1)

FIG. 1 shows the wiper blade rubber of the first embodiment according to this invention. The wiper blade rubber comprises a base portion 1 substantially of a polygonal cross section, a swinging portion 3 substantially of a trigonal cross section, a neck portion for connecting the base portion 1 and the swinging portion 3 and a lip portion 4 disposed at the top end of the swinging portion 3.

Figure 2:
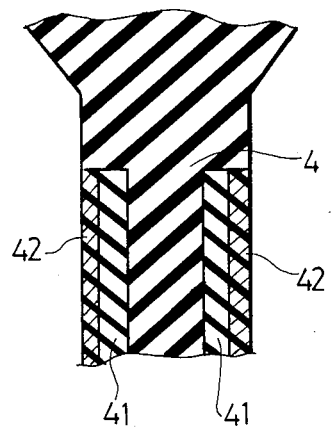

In the wiper blade rubber, the basic material is mainly formed of EPDM rubber, and a surface layer 41 mainly comprising blended rubber composed of NBR and PVC is formed to both of the surfaces of the lip portion 4 that slidingly moves on the glass surface. As shown in the enlarged view of FIG. 2, the surface layer 41 has a chlorinated surface layer 42 at its surface. The wiper blade rubber has about 11.5 mm height and about 7 mm width, the lip portion 4 has a thickness of about 0.75 mm and a height of about 1.9 mm and the surface layer 41 has a thickness of about 0.15 mm.

Explanation will be made for the method of preparing the wiper blade rubber, in which all of "parts" in the description mean parts by weight.

After sufficiently kneading 100 parts of EPDM (JSREP 35, manufactured by Nihon Synthetic Rubber Co., 50 parts of HAF carbon black, 5 parts of zinc oxide, one part of calcium stearate and 5 parts of dehydrating agent (CML #31, manufacture by Ohmi Chemicals Co.) by using a banbary mixer, they were cooled to room temperature and further kneaded with 10 parts of a vulcanizer (dicumyl peroxide/SiO$_2$=40/60) in an open roll to prepare EPDM rubber material as the basic material.

Separately, after sufficiently kneading 70 parts of NBR (medium nitrile, JSRN 241H, manufactured by Nihon Synthetic Rubber Co.), 30 parts of PVC (polymerization degree 1000), one part of stearic acid, 5 parts of zinc powder, 60 parts of FEF carbon black, 20 parts of dioctyl phtalate and 5 parts of dehydrating agent (CML #21, manufactured by Ohmi Chemical Co.) by using a banbary mixer, they were cooled to room temperature and further kneaded with 5 parts of a vulcanizer (dicumyl peroxide/SiO$_2$=40/60) to prepare a blended rubber material as the surface layer.

Figure 3:
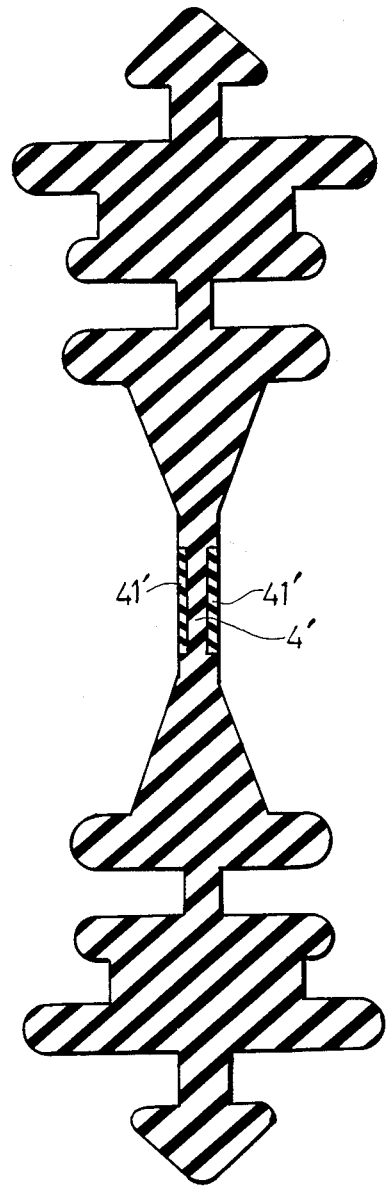

Then, two kinds of rubber materials described above were subjected to exclusion molding with two colors using an extrusion molding machine to obtain an extrusion molded material of a cross sectional shape shown in FIG. 3. The molded material had such a shape that two wiper blade rubbers were joined at the top ends of the lip portion 4', in which the blended material 41' is disposed in a thin-film like shape on both sides at the central portion.

The extrusion molding material was heated to a vulcanizing temperature by which the respective rubber materials were vulcanized and then joined integrally to each other.

Then, the vulcanized extrusion molded materials were chlorinated by being immersed into 0.4% aqueous solution of trichloro isocyanuric acid for chlorination to form a chlorinated layer on the surface of thin-film like blended rubber material. Then, it was cut at the middle of the extrusion molding material to obtain a wiper blade rubber as shown in FIG. 1.

The wiper blade rubber of this embodiment has the surface layer 41 composed of the blended rubber having the chlorinated surface layer 42 formed to both of the surface of the lip portion 4, while other portion is made of EPDM. Accordingly, the wiper blade rubber has a low frictional reisitance in the sliding movement and is excellent in the flexibility and ozone cracking reisitance. Further, the basic material made of EPDM with the great frictional resistance is exposed at the center of the top end of the lip portion 4. Accordingly, when the wiper blade rubber being attached to the wiper reciprocated along the glass surface, the top end of the lip portion 4 and the glass surface are in contact with each other at a point where the sliding direction turned thereby obtain a large frictional resistance. Accordingly, when the wiper is turned, the surface at the top end of the lip portion 4 is temporarily secured to the glass surface and the base portion 1 of the wiper blade rubber is turned riversely being actuated by the wiper. Then, the base portion 1 pulls the swinging portion 3 in the turned state and, further, the lip portion 4 at the top end of the swinging portion 3 follows the swining portion 3 and is turned easily. Accordingly, since the lip portion 4 is always in sliding contact with the glass surface at the corner of the top end surface thereof in the forward side of the proceeding direction to drive out water droplets, the droplets can surely be removed and there is no disadvantage in which only the one side is abraded sooner.

Although the extrusion molding material is cut after the chlorination in this embodiment, the chlorination may be effected after the cutting. In this case, since the surface at the top end of the lip portion 4 is chlorinated and a frictional resistance is further decreased, the endurance can be improved more.

(EXAMPLE 2)

Figure 4:
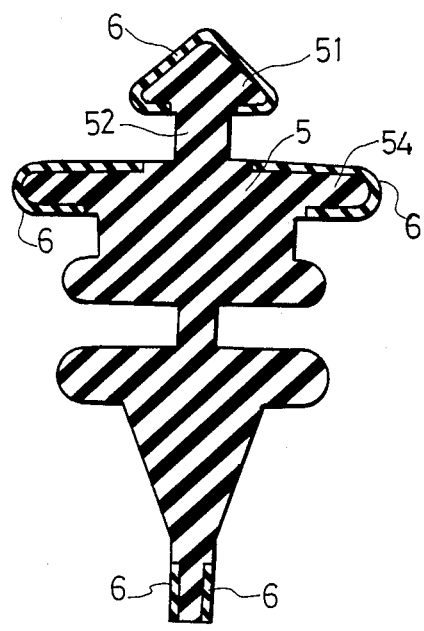
FIG. 4 is a cross sectional view showing a wiper blade rubber of the second embodiment.

FIG. 4 shows the wiper blade rubber according to the second embodiment of this invention. The wiper blade rubber has the same constitution as that in Example 1 excepting that the surface layer 6 composed of the blended rubber applied with the chlorination also at the surface for a portion of the base portion 5.

Figure 5:
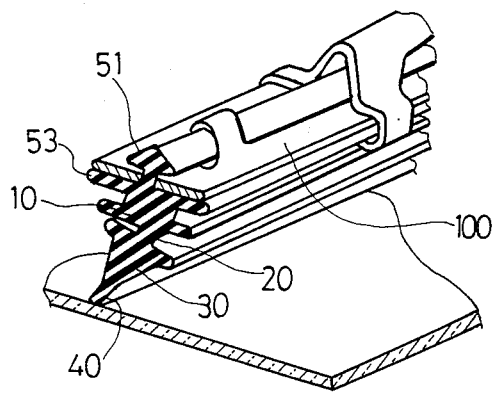
FIG. 5 is a perspective view illustrating the state where the wiper blade rubber is inserted into a backing plate and used as a wiper.

The base portion 5 comprises a head 51 substantially of a trigonal cross section, and a wing 54 in continuous with the head 51 by way of a neck-like joining portion 52. Upon use, the head 51 and the neck-like joining portion 52 are inserted into a backing plate 100 and held in a state putting the backing plate 100 between the head 51 and the wing 54 as shown in FIG. 5. Upon inserting the wiper blade rubber into the backing plate 100, the upper surface of the head 51, the lower surfaces of the head 51 and the upper surface of the wing 54 opposed to each other and the side and the lower surface of the wing 54 are brought into sliding movement with the backing plate 100 to result in the frictional resistance. The wiper blade rubber of this embodiment is adapted to decrease the frictional resistance as well and facilitate the work of inserting into the backing plate 100.

In the wiper blade rubber, the rubber material forming the basic material and the blended rubber material forming the surface layer are the same as those in Example 1. The wiper blade rubber are extrusion molded in the same manner as in Example 1 and then vulcanized, chlorinated and then cut into products.

In addition to the effect of the wiper blade rubber in Example 1, the wiper blade rubber has an additional effect that the insertion into the backing plate can be facilitated since the frictional resistance of the surfacee of the base portion 5 is facilitated.

(EXAMPLE 3)

Figure 6:
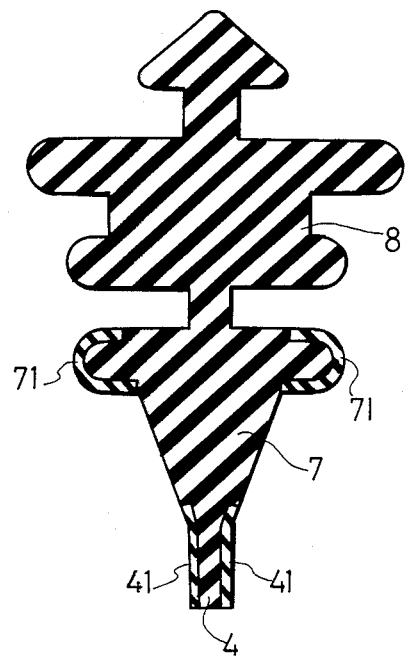
FIG. 6 is a cross sectional view showing a wiper blade rubber of the third embodiment.

FIG. 6 shows a wiper blade rubber in the third embodiment according to this invention. The wiper blade has the same constitution as that in Example 1 excepting that a surface layer 71 composed of the chlorinated blended rubber is also disposed to the surface of the swinging portion 7 opposed to the base portion 8 in addition to the surface layer 41 at the surface of the lip portion 4.

In this embodiment, since the sticking between the base portion 8 and the swinging portion 7 when the wiper is not used is prevented by the surface layer 71, reduction of the wipering performance and the generation of abnormal sounds are prevented by the surface layer 71 in addition to the effect of the wiper blade rubber in Example 1.

Figure 7:
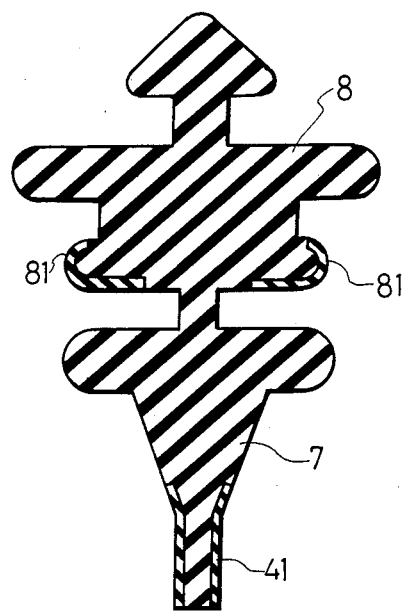
FIGS. 7 and 8 are respectively cross sectional views showing wiper blade rubbers of another examples.
Figure 8:
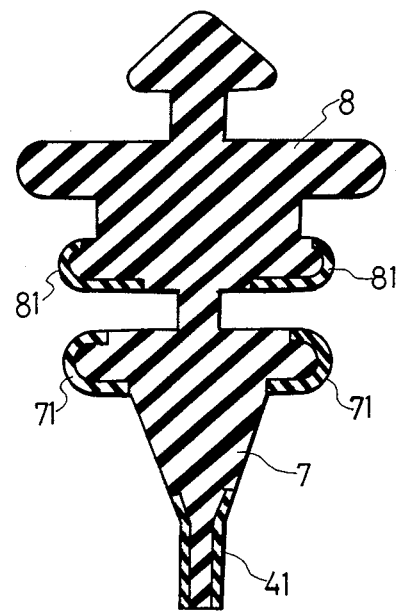
Figure 9:
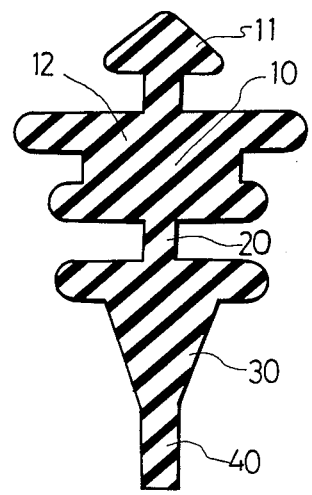
FIG. 9 is a cross sectional view showing a conventional wiper blade.

Further in the case where a surface layer 81 is formed to the surface of the base portion 8 opposed to the swinging portion 7 as shown in FIG. 7, the same effect can be obtained. Further, as shown in FIG. 8, when the surface layers 81 and 71 are formed to both of the surfaces of the base portion 8 and the swinging portion 7 opposed to each other, the sticking can be prevented more effectively.

Having now fully described the invention, it will be apparent to one of ordinary skill in the art that many changes and modifications can be made thereto without departing from the spirit or scope of the invention as set forth herein.

What is claimed is:

1. A wiper blade rubber of an elongated configuration comprising a base portion of large thickness, a swinging portion substantially of a trigonal cross section, a neck portion connecting said base portion and said swinging portion, and a thin plate-like lip portion disposed at the top end of said swinging portion, said base portion having a surface opposed to said swinging portion, and said swinging portion having a surface opposed to said base portion, wherein the basic material forming most part of said base portion, said neck portion, said swinging portion and said lip portion is a soft and flexible rubber mainly composed of vulcanized ethylene-propylene rubber, and at least the surface of said lip portion is disposed with a surface layer formed with a blended rubber composed of acrylonitrile-butadiene rubber and polyvinyl chloride resin and said surface layer has a chlorinated surface layer.

2. A wiper blade rubber as defined in claim 1, wherein the surface layer is also disposed to at least one of the surface of the swinging portion opposed to the base portion and the surface of said base portion opposed to said swinging portion.

3. A wiper blade rubber as defined in claim 1, wherein the blended rubber comprises a composition of from 15 to 70 parts by weight of the polyvinyl chloride resin based on 100 parts by weight of the acrylonitrile-butadiene rubber.

4. A wiper blade rubber as defined in claim 1 wherein said wiper blade rubber is held with a backing plate having slit.

5. A wiper blade rubber as defined in claim 4, wherein the base portion comprises a head to be inserted into the slit of a backing plate, a body not inserted into said slit and a neck-like joining portion present between said head and said body, and the surface layer is also disposed to the surface of said head in sliding movement with said backing plate and to the surface of said body opposed to said head.

* * * * *